United States Patent [19]

Cucchi et al.

[11] Patent Number: 4,970,590
[45] Date of Patent: Nov. 13, 1990

[54] SYSTEM AND DEVICE FOR PACKAGE MULTIPLEXING IN TRANSMISSION OF MANY DATA FLOWS GENERATED BY A SOLE ALGORITHM

[75] Inventors: Silvio Cucchi, Gaggiano; Marzio Barbero, Turin, both of Italy

[73] Assignee: Telettra - Telefonia Elettronica e Radio, Italy

[21] Appl. No.: 454,682

[22] Filed: Dec. 21, 1989

[30] Foreign Application Priority Data

Dec. 21, 1988 [IT] Italy ................. 23036 A/88

[51] Int. Cl.⁵ .................. H04N 7/04; H04N 7/08; H04N 7/13
[52] U.S. Cl. ..................................... 358/133; 358/141
[58] Field of Search ................... 358/133, 141

[56] References Cited

U.S. PATENT DOCUMENTS 4,914,515  4/1990  Van Lynt ..................... 358/141

Primary Examiner—Howard W. Britton
Attorney, Agent, or Firm—Ostrolenk, Faber, Gerb & Soffen

[57] ABSTRACT

A system for transmission of signals coming from a source and processed by an algorithm that, to minimize data (values+parameters), generates values that are encoded, for example, with variable length. The data flows generated by the algorithm are each ordered in packages with the addition of information of source, of frame and of management before being multiplexed.

3 Claims, 2 Drawing Sheets

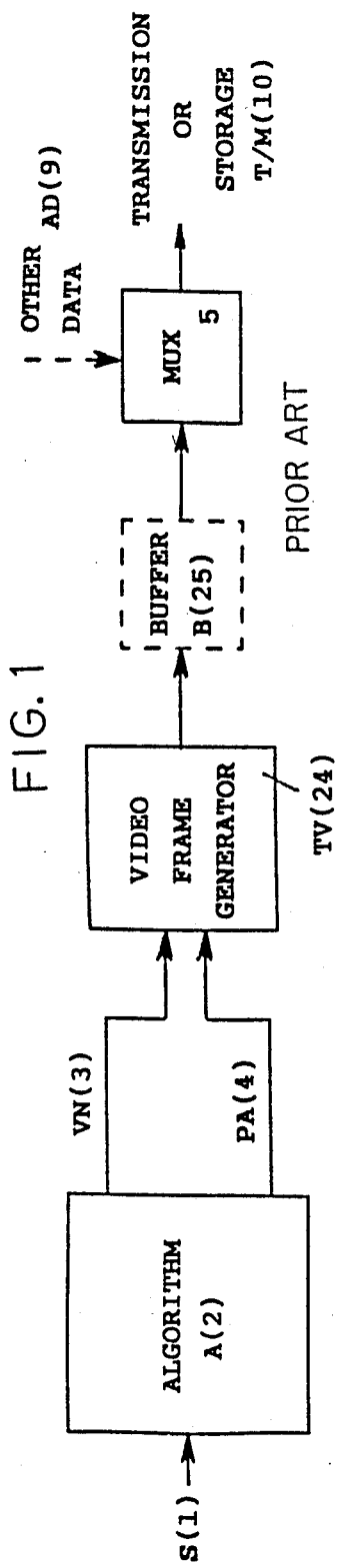
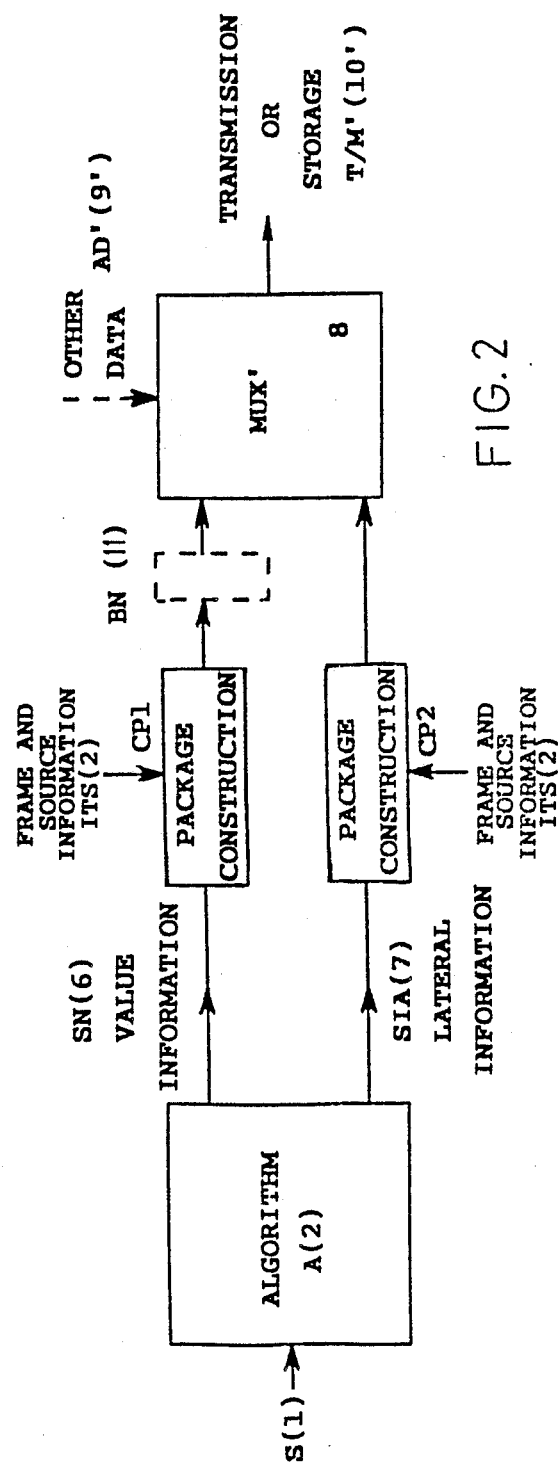

SYSTEM AND DEVICE FOR PACKAGE MULTIPLEXING IN TRANSMISSION OF MANY DATA FLOWS GENERATED BY A SOLE ALGORITHM

BACKGROUND OF THE INVENTION

1. Field of the Invention

The present invention relates to a system for the transmission of e.g. a video signal coming from a source and processed by means of an algorithm that, to minimize the data to be transmitted (values + parameters) and then reduce the bands necessary for the tranmission or storage, generates values that can be encoded and then multiplexed or stored. Further, the invention relates to a device for the implementing of the above mentioned system.

2. Description of the Related Art

Digital transmission systems for television signals generally use algorithms for redundancy reduction, whose main aim is to reduce the volume of data to be transmitted with respect to the quantity of data generated by the video source. These systems, particularly the systems of adaptative type (see FIG. 1), generate two data flows, when an algorithm A(2) is applied to the source of the televisive signal S(1). The first data flow VN(3), generally encoded with variable length, corresponds to the video source subjected to the algorithm processing; the second data flow PA(4) describes the manner by which the algorithm used for reducing the redundancy has processed the video source within each half-frame or suitable blocks in which the video signal was subdivided, and further the information relating to the correspondance among the encoded data VN(3) and the blocks in which the source was divided, and further other data. To be able to transmit the information generated by the algorithm (VN(3)+PN(4)), according to well-known techniques a video frame generator TV(24), is used that alternates in a suitable manner both the signals VN(3) that correspond to the sole video information inserted at suitable intervals with synchronization words or special words delimiting the video data blocks, and the ancillary data PA(4) that describe for suitable blocks of video signal points (at an upper limit, the whole televisive half-frame) the parameters or data that describe the condition of the machine used for reducing the redundancy. Therefore, the well-known techniques utilize a video frame generator TV(24) that mixes two data flows VN(3) and PA(4) into a sole data flow, and apply particular provisions so that, during reception, it is again possible separate the 2 data flows. These provisions are more simple in the case when the alternation between VN(3) and PA(4) is made at each half-frame, but in this case, disadvantageously a whole televisive half-frame must be stored before that all lateral data are known and available for the transmission. Further, according to well-known techniques, the information flow generated by TV(24) generally is sent to a buffer B(25) and a multi-plexer that foresees the generation of a frame including further data AD(a) (e.g. audio channels), and further an error correction code, for being able to send the tranmission or storing all information.

SUMMARY OF THE INVENTION

In accordance with of the present invention, the video data (that usually include synchronization words or delimiting words of the data blocks) are kept separated from the lateral data PA(4), making the transmitted (or stored) information particularly insensitive to the transmission (or storing) errors and allowing the achievement of a multiplexer structure which is very simple and very flexible when the available band changes.

BRIEF DESCRIPTION OF THE DRAWINGS

These and other features of the present invention will become apparent when the following text is read in conjunction with the accompanying drawings, in which:

FIG. 1 shows a prior art system for transmitting television signals;

FIG. 2 shows the preferred embodiment of the present invention; and

DETAILED DESCRIPTION OF THE PREFERRED EMBODIMENT

Figure 3:
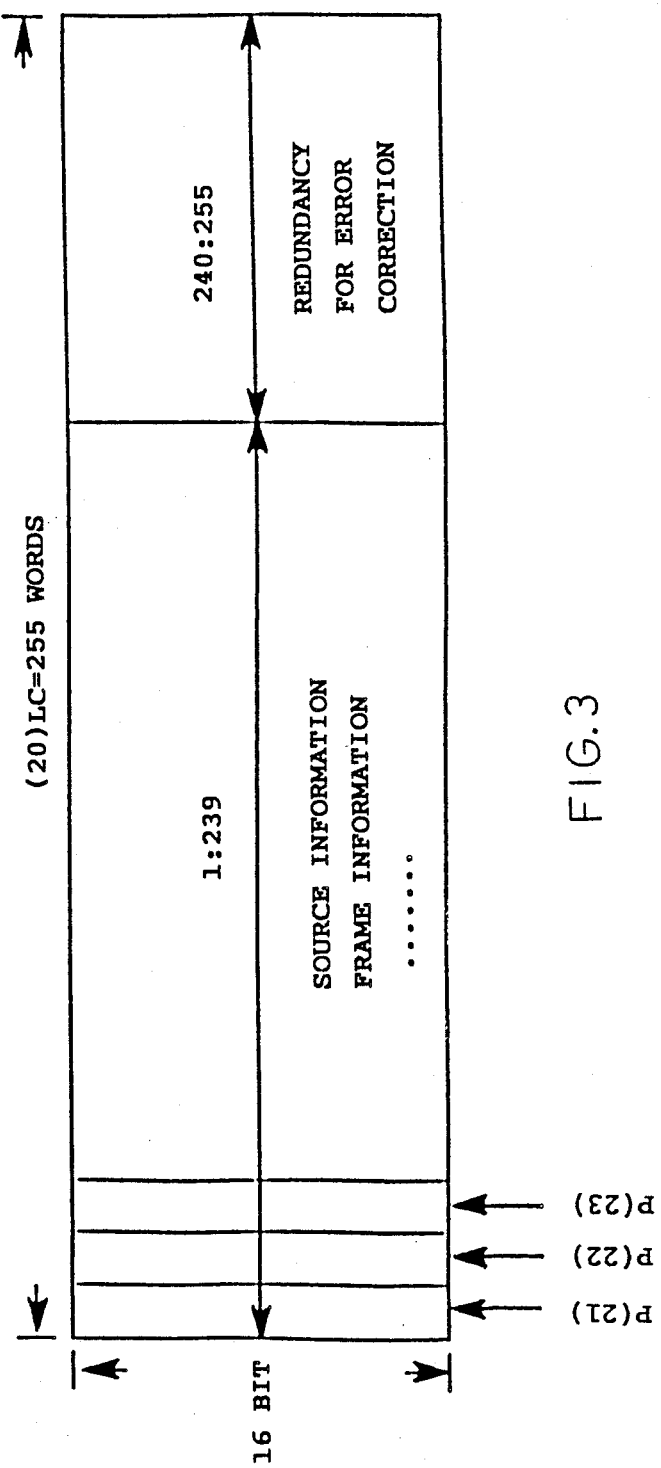
FIG. 3 shows a block of information transmitted with the system of the present invention.

As shown in FIG. 2, which represents the preferred embodiment of the invention, the lateral information SIA(7) and the value information SN(6) follow seperate paths and are mixed with one another only in the inside of the frame structure of multiplexer MUX'8 that is installed onto the transmission or storage line. It can be seen in FIG. 2 that the data sources 6 of values SN and 7 of ancillary lateral information SIA, before entering the the multiplexer MUX'8, are each subjected to a pre-processing named "Package construction"CP1, respectively CP2, that is obtained substantially by the following operations:

(1) subdividing of the information into parts having the same length for forming the packages PC1;
(2) adding to each package PC1, respectively PC2, the source and frame information ITS1, respectively ITS2, so that during reception, the meaning of the transmitted information can be recognized;
(3) adding to the package PC1, respectively PC2, the information necessary for its management (not shown).

These packages PC1, PC2 made in this manner enter a multiplexer MUX' that, however implemented using any well known technique carries out the transmission or the storage T/M (10') of the same data after having added other necessary or optional data AD' (9') (shown in FIG. 1 as AD (9).

It must be emphasized that the package CP2 is transmitted with priority as soon as the source SIA(7) has generated a sufficient amount of data to fill the same package, so that this priority information is available in reception in advance of the information SN(6), which is generally submitted to a transmission delay via a buffer BN(11), that further suspends the transmission of packages CP1 when the transmission of packages CP2 is required with priority.

The packages corresponding to the lateral data are introduced into the frame of the line multiplexer in predetermined positions or they are fixed with respect to the frame to simplify their extraction from the reception multiplexer.

In FIG. 2, it is shown that the construction of packages is made in both data flows SN(6) and SIA(7), as this is the preferred embodiment of the invention, even if it is generally sufficient to make the packages on one only path SIA(7) to obtain the great advantage of avoiding mixing of the data.

Further, if an error correction code for protecting the source is used, and this same code generates a data block, this data block can be used in an efficient manner as a data package (see e.g. W. W. Peterson and E. W. Woldon, "Error Correcting Codes", Second Edition, MIT Press). For example, if a BCH code (Base-Chaudhuri-Hocquenghem) (239, 255) is used with interleaving 16, a structure can be foreseen which is similar to the structure represented in FIG. 3 for defining the package. FIG. 3 shows the information block corresponding to the BCH block (239, 255) with interleaving 16.

In the case shown, the block is made up of 255 words (code length=LC), each word P(21) being formed of 16 bits. As is typical, among these 255 words, 16 words are used for the redundancy information necessary for the error correction. The other 239 available words are the specific information (values or lateral information), the source information, the frame information and the other information necessary for the package management. For example, the first word P(21) can be used for recognizing the type of source, for example SN(6) or SIA(7); the second word P(22) can be used for recognizing the first information transmitted in the package. The third word can be the buffer padding (if present). The fourth, the package numbering, if necessary. All information coming from the source are successively written in the package up to its filling.

The system of the invention, having for example the structure shown in FIG. 2, has many advantages with respect to the classic structures (e.g. the one of FIG. 1), in that:

(1) it avoids mixing data with different meaning (values and lateral information), making the data flow, fulfilled in this manner, resistent to eventual errors;

(2) it allows, during the reconstruction phase, an easy assignment of the data, as each package is associated with the source and frame information, without needing complex frames;

(3) it allows an easy adaptation of the system to the various transmission or storage speeds, although it has, at the multiplexer input data flows with constant speed (e.g. lateral information) and data flows at a speed that can be variable.

The device "Package constructor" CP1 and CP2 used in the invention can be made using well-known techniques and very simple conventional means, for example with a Dual Port RAM memory and a controller of the memory. The controller foresees the emmission of data coming from the algorithm present in the dual port RAM, inserting in predetermined positions the package source, frame and management information and providing successively the transfer of the package to the buffer or directly to the multiplexer. The controller can be made both with registers and classic flip-flops and, using a more advanced implementation, with a microprocessor, that, guided by a program, can carry out the management of the Dual Port RAM, where the package is stored before being transmitted to the multiplexer or to the buffer. Alternatively, the Dual Port RAM can be made of a standard RAM in the case where the speed of data flow allows the use thereof.

What is claimed is:

1. A system for the transmission of video signals coming from a source and processed by means of an algorithm that, to minimize the data (value+parameters) to be transmitted, and then reduce the bands necessary for the transmission or the storage, generates values that can be encoded and then multiplexed or stored, wherein the data flows generated by said algorithm are each separately ordered in packages with the addition of the necessary information of source, frame and management of each package, before being submitted to multiplexing or storage.

2. A system according to claim 1, wherein to construct the packages, an error correction code is used, in which case this last one is already present and it is a block code for all the data flows generated by the algorithm.

3. A device for implementing the system of claim 1, which system takes over each of the flows generated by the algorithm and provides, for each flow, the formation of data packages with the addition of the source, frame and management informations, said device being inserted upstream from a multiplexer or a buffer associated with the multiplexer, said device including:
   a subdivider of the information in packages having an equal length;
   at least one inserter for the source and frame information contained in each package; and
   at least one inserter for the information necessary for management.

* * * * *